UNITED STATES PATENT OFFICE.

ABRAHAM B. LANDIS, OF ENFIELD, PENNSYLVANIA.

CHANGE-SPEED TRANSMISSION.

1,296,533.　　　　　Specification of Letters Patent.　　Patented Mar. 4, 1919.

Application filed December 15, 1916. Serial No. 137,253.

*To all whom it may concern:*

Be it known that I, ABRAHAM B. LANDIS, citizen of the United States, residing at Enfield, in the county of Montgomery and State of Pennsylvania, have invented certain new and useful Improvements in Change-Speed Transmissions, of which the following is a specification.

My said invention relates to change speed transmission gearing adapted more especially for motor cars. It is a further improvement on the devices in my application Serial No. 72,237 filed January 15, 1916, and Serial No. 108,739 filed July 11, 1916, but has the same object as said devices to secure an easy change of speed in a motor car by a singl easy movement of a single element with the absolute avoidance of clash of gearing or shock to the car characteristic of shifting gear devices.

The device is fully described and claimed in the accompanying drawing and specifications. In the drawing of which all like reference characters indicate the same parts.

Figure 1 is a top view of the gear casing with the cover removed and the gearing therein shown in partial horizontal section.

Fig. 2 is a vertical cross section taken on line 2—2 of Fig. 1 looking in direction of arrow.

Fig. 3 is a view of same section as Fig. 2 showing a gripping element released.

Fig. 4 is a vertical cross section on line 4—4 of Fig. 1.

Fig. 5 is a vertical longitudinal section on line 5—5 of Fig. 1 looking in direction of arrow.

Fig. 6 is a vertical longitudinal central section of part of Fig. 1 readily seen by the characters.

Fig. 7 is a cross section on line 7—7 of Fig. 6 looking in direction of arrow.

Fig. 8 is an end view of one of the change speed elements taken on line 8—8 of Fig. 1 looking in direction of arrow.

Fig. 9 is a cross section taken on line 9—9 of Fig. 5 looking in direction of arrow.

Fig. 10 is a vertical cross section taken on line 10—10 of Figs. 1 and 11 looking in direction of arrow.

Fig. 11 is a side elevation of Fig. 10 in partial section.

Fig. 12 is an end view of Fig. 13 taken on line 12—12 looking in direction of arrow.

Fig. 13 shows the arrangement for coupling the elements of first and second shafts.

Fig. 14 is a plan view of one of the parts of Fig. 13.

Fig. 15 is a side view of the transmission shown as mounted in a motor car.

Fig. 16 is a section taken on lines 16—16 in Figs. 1 and 5 looking in direction of arrow.

Fig. 17 is a sectional view taken on line 17—17 of Fig. 5 looking in direction of arrow.

Figs. 18 and 19 are some of the details.

Fig. 20 is a modification.

All drawings show position for the first speed.

In said drawings A is the gear casing and B the cover for same. C is chassis of a motor car, D the fly wheel of the motor, E the motor, F a foot lever for starting the car, G a shaft located beside the steering wheel post with a small lever at its top and beneath the steering wheel (not shown) by which the change speeds are effected all of which require no specific description here but will be referred to in further describing the device.

The gear comprises a first driven shaft 15 and a second driven shaft 16, said shaft 15 is journaled in a bearing 18, secured to the cross web 17 of the casing A, and in a hub of a frictional clutch bell 20. The hub of said bell is journaled in a bearing 36 secured to the end of the casing A. The outer end of said hub has secured thereon a flange 22 which is secured to the flange of a motor shaft or any source of power. As the frictional clutch is the same as shown and described in my applications No. 72,237 and No. 108,739 and forms no part of the present invention a specific description here is not required.

The driven element 21 of said frictional clutch is secured to the shaft 15 and said clutch is made active by pressing the disk 29 through the means of levers 31 and rollers 30 which engage therewith, their action being later described.

A disk 29 is secured to a hub 28 said hub having projecting portions 32 which engage with dogs 35—35 (see Fig. 6) pivoted in slots of collar 34 secured to shaft 15 by which said frictional clutch is locked into engagement having been closed either by foot lever F or automatically by power as will be later described.

On shaft 15 is a flanged disk 42 (see Fig. 6) said disk having a hub 100 which is slidable on said shaft but positively rotates therewith by means of a key 38 secured in said shaft, said hub 100 is journaled in bearing 18. Adjoining said disk is loosely mounted on said shaft 15 a housing 46 having studs secured therein with planetary double gears of different sizes 50—50 mounted on same (see Figs. 1 and 8) the large size of said double gear meshing with an integral pinion 52 on shaft 15 the other size of said gear meshing with a loosely mounted pinion 53 on said shaft. Said pinion 53 is secured to another housing 54 (preferably by screw threads) and forms the center or bearing of said last named housing on said shaft 15. Within a flange of said housing 54 a pinion 55 is secured by a key to shaft 15, said pinion also forms a bearing in said flange as well as on shaft 15 for said housing to rotate upon. Housing 54 also has two planetary pinions 51—51 mounted on studs (see Fig. 2) said planetary pinions meshing with pinion 55 and with an internal gear ring 58 encircling and journaled on said housing.

Grip rings or bands 47—47 are fitted around housing 46 and said internal gear ring 58. The grip rings are slitted on one side as shown in Fig. 2 forming grip bands and the operation will be later described. Both housings are normally loose upon shaft 15 and the pinions engaging the planetary pinion are secured to said shaft, and as long as the housing 46 and gear ring 58 are free to turn no motion will be transmitted to shaft 16 since they will revolve while shaft 16 is stationary.

On housing 42 there is a flange having a tapered inner surface which has for its object the engagement of a tapered grip flange 44 on disk 42 which fits the other taper. Said disk 42 with its hub 100 being slidable on shaft 15 allows an end pressure to engage the flange 44 with the housing 56. The manner in which this pressure is produced will later be described.

The grip rings 47—47 (see Figs. 2 and 3) being slitted forming an upper and lower lug, allows the engagement of said ring with gear ring 58 and housing 46. The lower lugs of said grip rings rest on tapered blocks 60 which rest on a housing 61 secured to the casing A. A beveled surface on said housing engages the taper of the block 60 and has for its purpose the adjustment of the grip rings. The grip rings are compressed upon said gear ring and housing by toggle links 110 one of which engages the upper lug of said ring and the other engages a bar 62 inserted in perforations in standards 63 of said housing 61. These toggle links are connected by a pin 64. A roller 65 is loosely mounted on said pin. In Fig. 3 the grip band is shown released the toggle links being at angle with each other and in Fig. 2 they are on line with other and the grip is closed.

The blocks 60 are adjusted to increase or diminish the grip of said rings by screws 66 and are operative outside the casing A. The standards 63 on said housing 61 have a cam shaft 67 journaled therein. On said shaft are slidably mounted eccentric cams 68—68 but are held against rotation on them by key secured therein, sliding in key ways on said shaft. These cams have a beveled collar on one end which engages with collars 69 which are secured on shaft 70. These collars are cut out on one side forming cams and a space which allows the eccentric cam 68 to be pressed by spring 71 bringing it in path with the rollers 65 on the toggle links. So that when shaft 67 rotates the eccentric 68 forces toggle links 110 to a straight line position producing a severe pressure of the grip rings 47 on the internal gear and housing. The collars 69 are mounted on shaft 70 with their cut out portions at right angles with each other so that when set that one eccentric is in the path with the roller 65, the other one is out of the path with same. In rotating shaft 70 due to the cam on said collar, it forces the eccentric against spring 71 and out of path of roller 65, when the eccentric cam is moved out of path of roller 65 on one of the toggle links, it comes into path of the lever or arm 72 which is secured in one of the same toggle links. Therefore the rotation of shaft 67 after said eccentric has been shifted out of path of the roller, forces said lever downward releasing said toggle and its grip ring while the other eccentric at the same time is in path of the roller applying the grip to said other ring 47. Eccentric cam 73 is also of similar construction as 68 and is also moved endwise with a collar 74 of same construction as 69 secured to shaft 70 to force said eccentric cam out of path of a roller 85 (see Fig. 7) and a spring 75 forces said eccentric cam into path of said roller. This eccentric cam engages means which forces the grip flange 44 of disk 42 into the flange of the housing 46 which I will presently describe. This grip engages the connection for direct drive of the car from the motor and when this is the case all gearing are inactive.

The manner in which this last named grip is made effective is shown in Fig. 7. A collar 80 on bearing 18 has a lug 81 on its lower side to which a connecting rod 82 is pivoted, a right and left hand adjusting screw 83 connects this with another part 84. The end of 84 is bifurcated and a roller 85 is pivoted therein. To this same pivot is connected an arm 86 which is pivoted at the other end to the standard 63 of the housing 61. A catch 87 is also pivoted to said standard and is arranged to lock arm 86, by means of spring 88, when it has been depressed by the eccentric cam 73 by its rotation. In Fig. 1 the collar 80 shows a cam 90. This collar has three of these cams equally divided around its circumference on the edge, as shown, which engages with similar notches on the bearing 18.

When the cam shaft 67 rotates, the eccentric cam 73 being in path with roller 85 it forces said collar 80 around and by means of the cams 90 forces the disk 42 with its flange 44 into the flange on housing 46. Similarly when the eccentric cam 73 is moved out of path of roller 85 it comes into path of the catch 87 and when said cam shaft 67 rotates it unlatches said arm 86 and by means of spring 89 said collar 80 is caused to rotate releasing said grip 44 and 46.

This gripping force brings an end pressure on bearing 18 and to accommodate this I employ ball thrust bearings, as shown in Fig. 6, which effectually relieves any objection to this.

The collar 34 has a flange 101 on the periphery of which is cut a worm thread (see Figs. 1, 6 and 9) which engages a small worm wheel 102 which is secured to a shaft 103 journaled in a bearing 104 secured to web 17 of casing A and another bearing 105 on one of the standards 63 of housing 61. The upper end of said shaft has an integral bevel pinion 106 which meshes with a bevel gear collar 107 on shaft 67. The opposite end of said gear collar has clutch teeth formed thereon which engage with a slidable mounted clutch collar 108. This gear is loosely mounted on shaft 67 but is arranged to prevent side movement by a small collar between the clutches. Said clutch collar 108 has a key engaging a key seat in said shaft 67 and is free to move longitudinally but not to turn thereon.

On the end of shaft 67 is secured a cam 120. The office of this cam is to automatically close the frictional clutch at each change of speed which is locked in position by the dogs 35 in collar 34. This cam engages a roller 121 pivoted in a bifurcation of a plunger 122 which slides in a bracket 123 secured to casing A. A sleeve 126 with an arm 124 engaging said plunger 122 is mounted on shaft 125. On said shaft also are secured arms 31 on the lower end of which rollers 30 engage to close the frictional clutch. Said sleeve 126 is loosely mounted on said shaft being free to a limited end movement but cannot turn except to press the arms 31 on the frictional clutch, through the means of an adjustment screw 127 in a lug 128 on said sleeve engaging one of the said arms 31.

As will be noted the bevel gear 107 due to its positive connection with the shaft 15 must constantly revolve while said shaft revolves. Shaft 67 however must only make one revolution whenever a change of speed is effected. This is accomplished through the slidable clutch collar 108. This clutch collar is made to engage the clutch gear wheel 107 whenever required by spring 109. This clutch is held out of engagement by a small pin 116 in the hub of the clutch collar 108 and engages a small cam faced lever 111 which pivots on a pin 112 secured in one of the standards 63. This lever is of right angle form (see Fig. 9), one end of which comes in contact with said pin, and the other end engages with the square end 113 of the shaft 70, said square end forming a cam action on said lever 111. When shaft 70 is rotated one fourth revolution (the amount of motion required at each change of speed) said square cam depresses said lever 111 raising the other or cam end of said lever to clear the pin 116 allowing the spring 109 to press the clutch collar into engagement with the clutch of gear 107 causing same to revolve said shaft which is stopped after one revolution by pin 116 coming in contact with the cam end of the lever 111 separating the clutches, and the plunger 122 with its roller dropping into the low part of the cam 120 holds it in this position. A spring 114 holds the little lever 111 against the square cam 113 and the hub of collar 108.

On the end of shaft 70 is a catch 115 (see Fig. 9) which when said shaft is in the stop position of the gear it is on top of same. The position shown in Fig. 9 is for the first speed. As will be seen when this is the case, said catch 115 comes in contact with the lug 127 and moves the sleeve 126 endwise against the lever 31. Said sleeve being held in normal position as shown in Fig. 9 by a spring 128. In Figs. 1 and 16 it will be seen the arm 124 engaging with the plunger 122 that both of these are notched. So that when said sleeve is in normal position, as shown the notches on both coincide and make said plunger active in closing the frictional clutch. But when sleeve 126 is moved by the catch 127 the notches will allow the plunger to raise without effecting an automatic closure of said frictional clutch. This is to prevent automatically closing the clutch at the stop position.

Shaft 70 as stated is rotated one fourth turn at each change of speed in one direction for upward change of speed and the other direction for downward change of speed. Said shaft 70 has a spiral gear 75 secured thereto, another similar gear 76 engaging therewith is secured to a cross shaft 77 in the casing A. On the outer end of said shaft 77 is secured a sector 78 with notches 79 (see Fig. 15) which are engaged by a roller 91 journaled on the end of an arm 92 which arm is pressed by a spring 93. By this sector and its spring pressed roller the correct position of the shaft 70 is acquired for all speeds as well as the stop position. The gear has three speeds, therefore there are four positions including the stop position. This sector 78 has an arm 94 secured therewith. A rod 95 connects said arm with another arm 76 which is secured to the shaft G which extends up to a point below the steering wheel of the car in easy reach of the driver.

Shaft 140 is journaled in the sides of the casing A and extends across same (see Figs. 5 and 6). On said shaft is secured an arm 141 which engages with the upper end of a bifurcated piece 142 which fits over shaft 70 (see Fig. 17). One leg of the piece 142 is engaged at its lower end by a cam 143 secured on and to turn with shaft 67. As shown said shaft 67 is at its stop position and cam 143 is in position to engage piece 142 at its lower end. At the moment said shaft starts to move the said cam raises piece 142 and lifts arm 141 and partially rotates shaft 140. On shaft 140 immediately above shaft 15 is secured a collar 144 (see Fig. 6) and an arm 145 is secured in said collar, a roller 146 is journaled to the lower end of said arm, said collar engages a flange on collar 102 which slides on the collar 34 secured to shaft 15. A slight end movement of collar 102 by its engagement with the dogs 35—35 causes same to disengage with the extension parts 32 of the hub 28 of the frictional clutch pressure plate 29. It will be seen that when part 142 is raised by the cam 143 the partial rotation of shaft 140 with its arm 145 and roller forcing the collar 102 and raising dogs 35 the frictional clutch will be automatically released the moment the shaft 67 starts to rotate. After this the change in engagement of the grip elements which changes the driving action through the different speed elements is effected, and lastly during said one revolution of shaft 67 the frictional clutch is again automatically reset by cam 120, all being accomplished by the power from the transmission gearing. Figs. 12, 13 and 14 show the arrangement by which the driving action of shaft 15 is connected with shaft 16 by a clutch device for the forward movement of the car by which the car is allowed to move ahead of the motive power by means of said clutch wiping out of engagement and means provided to avoid any rasping of said clutch in so doing. Fig. 12 is a face view of said clutch shown taken on line 12—12 of Fig. 13 showing the clutch teeth. In Fig. 13 said clutch is shown disengaged for forward movement but engaged for backward movement through means of disk 48 with its notches on the periphery engaging with the catches 200 and 201 shown also in Figs. 1 and 4. As this backward movement arrangement is no part of this invention and is fully described in my application No. 108,739 filed July 11, 1916, a description here is not required. As stated when the car moves ahead of the power said clutch by the angles on its teeth wipes out by that action. A ring 206 is mounted on four supports 205 which are secured to or are a part of the housing 54. Said supports have rollers 204 journaled thereon. Said ring has four notches formed on one edge for the engagement of said rollers as shown in Fig. 14. The disk 48 when said clutch is in engagement bears against the ring 206 when changing from backward to forward motion of the car, and the friction of said bearing will cause said ring to slightly rotate on support 205 and in doing so will bring rollers 204 to engage the deeper part of the notches and allow said clutch to fully engage. Springs 208—208 engage with pins in said ring 206 with one end and the other end engages with the housing 54 (not shown). When the clutch is wiped out by the bevel sides of its teeth when the car moves ahead of the power, the friction of said ring on the disk 48 as well also as the tension of spring 208 causes the ring to rotate and rollers 204 to seat on the higher point or shelf in the said notch (Fig. 14) which absolutely holds said clutch surfaces free from each other avoiding rasping. Immediately when the power or driving element of the clutch moves a little faster than the driven element the friction of said ring on the disk 48 causes said ring to move in the opposite direction and due to the angle and low part in said notch allows the ring to move laterally and also the disk 48 and therefore its clutch face is caused to engage that of the other clutch member. Said disk with its clutch face is caused to move into quick engagement when the driving element advances over the driven through the wedge shaped end of arm 210 engaging with lever 212 by means of a spring 211 on the outside of the casing A, shown in Fig 15. This lever 212 is secured to a shaft 213 which is journaled in casing A (see Fig. 4) on the inner end of shaft 213 is an arm 214 the lower end of said arm having two pins 215 engaging one on each side of disk 48 by which said clutch is brought and held in normal engagement for both forward and backward movement. By this arrangement said clutch always quickly engages and avoids rasping when disengaging by the driven element moving ahead of the driver.

In Fig. 12 the ring 202 has for its object to always insure the full depth engagement of said clutch so that the clutch will never be taking hold at a partial engagement. Fig. 18 shows this ring in detail and Fig. 19 on enlarged scale shows how this full engagement is required. The lugs 220—220 on ring 202 extend inward over the path of the clutch teeth. On opposite side of clutch face on 48 one tooth is removed as shown in Fig.

19 at X. This is for the purpose of making room for the lugs 220 on ring 202. This ring as shown in Fig. 12 has two springs attached thereto at their one end and at the other end is fastened to the disk 48. These springs hold ring 202 with its lugs 220 in the normal position as shown in Fig. 19 in which is shown the clutch part 56 just engaging the lugs 220 on ring 202 in clutch part 48. The clutch faces however will not come together until the ring 202 has been turned far enough for the clutch teeth to engage each other when there will be time enough for the full engagement of the clutch through the spring 211, Fig. 15. Should the clutch tooth on 56 just miss catching the lugs 220 then said lugs will hold the clutch engagement apart until the next tooth on 56 will register to catch the lugs and then move farther until full depth is attained. This will always insure full depth of engagement of tooth before the load is taken hold of which will be clear.

Fig. 20 shows a modification of the driving of shaft 67 the connection with the power in this case being made on the driving side of the frictional clutch 20 instead of from the driven side as shown in the other drawings. The object of this is that owing to the positiveness of the drive on the driving side of the said frictional clutch this will always insure prompt rotation of shaft 67 whenever the speed lever is moved to change speed, while from the driven side of said clutch the opening and closing of the grips for the change of the different speeds is dependent upon the inertia of said driven parts and the oil friction in the frictional clutch. While these can be arranged to be sufficient the modification shown in Fig. 20 will always make this positively sure of action.

Having now described the device I will recapitulate its operation.

When this device is mounted in a motor car and the car is stopped, the frictional clutch is open or disengaged while the motor is running. To start the car, a gentle pressure of the foot lever F brings the frictional surface in the clutch into action and when fully pressed gives the first or slowest speed, then by pulling the hand lever on shaft G to position for first speed said frictional clutch is automatically locked when the foot can be removed from the lever F. To change to second speed the lever is moved to second speed. This action rotates shaft 70 one fourth turn.

The cam 113 on the end of shaft 70 when it is turned depresses lever 111 raising its other end to escape pin 116 when spring 109 will press clutch collar 108 into engagement with the clutch gear 107 and which is constantly rotating will cause shaft 67 to revolve. The cam 143 which upon the first movement of said shaft lifts part 142 raising arm 141 partially rotating shaft 140 and through arm 145 with its roller 146 engaging the flange on collar 102 unlatches the dogs 35 from the projection 32 on collar 28 instantly releasing said frictional clutch by spring 37. The cam collar 69 on shaft 70 then forces the eccentric cam 68 on shaft 67 out of path of roller 65 in toggle links 110 and brings said eccentric cams 68 into path of lever 72 which is secured to one of the toggle links, then the eccentric cam 68 depresses the said lever 72 and opens the toggle, releasing the grip band 47 on the internal gear ring 58 breaking the power connection through that speed element. At the same time the other eccentric cam having been moved into the path of the roller in toggle links closes the grip band around the housing 46 making the speed element for second speed active and, as shaft 67 still further revolves and completes one revolution, cam 120 on the end of shaft 67 raises the plunger 122 and through arm 124 partially rotates shaft 125 and through the medium of sleeve 126 and arms 31 with the roller 30 at their lower end completely closes the frictional clutch and is automatically locked completing one change of speed through a single movement of one lever. When said revolution of shaft is complete the pin 116 comes in contact with the cam end of lever 111 and by its rotation drawing said clutch collar 108 from engagement with the gear clutch 107 it stops the motion of said shaft 67. The change from second to third or highest speed is in like manner effected. The reverse movement of change speed lever will in like manner through the same process change the speeds.

The transmission is both progressive and selective and all that is necessary to change selectively is to move the speed change lever quickly to position wanted. The sector 78 with its spring pressed roller 91 positively gives the correct position of this lever for the various speeds as well as for the stop position.

Having now described my said invention what I claim as new and desire to secure by Letters Patent is:

1. A change speed gearing comprising a casing, a shaft journaled therein, a source of power, a frictional clutch coupling said shaft with said source of power, speed elements mounted on said shaft, grip bands encircling said speed elements, pressure devices by which said grip bands are compressed to hold one of the members of said speed elements, actuating means by which said pressure devices are made effective to compress and release said member of the speed elements, substantially as set forth.

2. A change speed gearing comprising a casing, a shaft journaled therein, a source of power, a frictional clutch coupling said shaft with said source of power, housings mounted on said shaft, change speed gearing mounted in said housing, grip bands encircling said housings, said grip bands serving to hold stationary an element of the change speed gearing in said housings, pressure devices by which said grip bands are made effective to hold said element, actuating means by which said pressure devices are operated to close and release said grip bands, substantially as set forth.

3. A change speed gearing comprising a shaft, a source of power, a frictional clutch coupling, said shaft with said source of power, speed change elements mounted on said shaft, gripping devices with said speed elements to hold stationary one of the parts of said element, pressure devices by which said grip elements are made effective, actuating means by which said pressure devices are actuated, means by which said cams are alternatively made active to close and open said grip elements through said pressure devices, substantially as set forth.

4. A change speed gearing comprising a shaft, a frictional clutch, a source of power, said frictional clutch coupling said shaft with said source of power, speed elements mounted on said shaft, gripping devices arranged to hold stationary one of the parts of said speed element, toggles by which said grip elements are made effective, cams by which said toggles are alternately actuated to open and close said grip elements, and means by which said cams are operated by the power, substantially as described.

5. A change speed gearing comprising a casing, a shaft, a source of power, a frictional clutch coupling said shaft with said source of power, speed elements mounted on said shaft, means by which one of the parts of said elements is held stationary, cams controlling the means for holding said part stationary, means by which said cams are operated by power to alternately hold and release said means for holding stationary said part and means by which said frictional clutch is released and reset by the power, substantially as specified.

6. A change speed gearing comprising a shaft, speed elements mounted on said shaft, a source of power, a frictional clutch coupling said shaft with said source of power, grip elements for holding one of the parts of said speed elements stationary, means for actuating said grip elements, a shaft rotated from the said source of power, cams for making said grip elements effective or ineffective mounted on said shaft, substantially as set forth.

7. A change speed gearing comprising a shaft, speed elements mounted on said shaft, a source of power, a frictional clutch coupling said shaft with said source of power, grip elements for holding one of the parts of said speed elements stationary, means for actuating said grip elements, a shaft rotated from the said source of power, cams for making said grip elements effective or ineffective mounted on said shaft, cams for releasing and resetting said frictional clutch, substantially as set forth.

8. A transmission gearing comprising a shaft, a source of power, a frictional clutch coupling said shaft with said source of power, a shaft operated from said source of power, cams for setting and releasing said frictional clutch mounted upon said last named shaft, substantially as set forth.

9. A change speed gearing comprising a shaft, speed elements on said shaft, a source of power, means for alternately making said speed elements active and inactive by the said source of power, means by which through one movement of a single element said first named means is made active to change from one speed to another, substantially as described.

10. A change speed gearing comprising a shaft, a frictional clutch, a source of power, speed elements mounted on said shaft, means and cams by which said speed elements are made effective and non-effective, a shaft upon which said cams are mounted, means for rotating said cam shaft by said source of power, means for shifting said cams upon said shaft to make said speed element effective and ineffective, an operating element, means by which the shifting of said cams and the revolving of said cam shaft are controlled by a single movement of said operating element, substantially as specified.

11. A change speed gearing comprising a shaft, a frictional clutch, a source of power, speed elements mounted on said shaft, cams controlling the action and inaction of said speed elements, a shaft on which said cams are mounted and adapted to be moved endwise thereon, a second shaft, cams mounted on said shaft to move said first named cams endwise, means to rotate said last named shaft by the movement of a single element, a cam on said first named cam shaft by which said frictional clutch is closed, means by which said first named cam shaft is caused to rotate by said source of power effecting the releasing of said frictional clutch releasing the power through one speed element, engaging the power through another speed element, and resetting said frictional clutch all in succession, substantially as specified.

12. A change speed gearing comprising a shaft, frictional clutch, a source of power, speed elements mounted on said shaft, a cam shaft, cams mounted thereon by which said speed elements are made active and inactive, said cam shaft rotated by said source of power, a cam on said cam shaft to release said frictional clutch, another cam on said shaft to close said frictional clutch, means by which through the movement of a single element said cam shaft is made active, substantially as specified.

13. A change speed gearing comprising a shaft, speed elements mounted on said shaft, a source of power, means for holding stationary one of the parts of said speed elements, cams for effecting said means operated by said source of power, substantially as set forth.

14. A change speed gearing comprising a shaft, speed elements mounted on said shaft, a source of power, means for holding stationary one of the parts of each of said speed elements, cams for operating said holding means and cams for controlling the position of first named cams, substantially as set forth.

In testimony whereof I affix my signature in presence of two witnesses.

ABRAHAM B. LANDIS

Witnesses:
 REES C. ROBERTS,
 M. T. HUBER.